United States Patent [19]

Jaudt

[11] 4,111,394
[45] Sep. 5, 1978

[54] ADJUSTING DEVICE FOR THE GLAND PACKING OF A FLAT SLIDE-VALVE

[76] Inventor: Andreas Jaudt, Schongauerstrasse 10 c, D-8900 Augsburg, Fed. Rep. of Germany

[21] Appl. No.: 790,736

[22] Filed: Apr. 25, 1977

[30] Foreign Application Priority Data

Feb. 18, 1977 [DE] Fed. Rep. of Germany ....... 2707036

[51] Int. Cl.² .......................................... F16K 31/44
[52] U.S. Cl. ..................................... 251/214; 251/327
[58] Field of Search ...................... 251/214, 326, 327

[56] References Cited

U.S. PATENT DOCUMENTS

| 3,033,517 | 5/1962 | Rovang | 251/214 |
|---|---|---|---|
| 3,412,972 | 11/1968 | Williams | 251/214 X |
| 3,789,879 | 2/1974 | Hale | 251/214 X |
| 3,917,223 | 11/1975 | Sidler | 251/214 |
| 4,026,517 | 5/1977 | Still | 251/214 |

Primary Examiner—Harold W. Weakley
Attorney, Agent, or Firm—Pollock, Vande Sande and Priddy

[57] ABSTRACT

The pressure exerted by an elongated rectangular gland packing on an associated flat slide valve within a valve housing is adjusted by means of an elongated adjustment member disposed within said housing adjacent the face of the packing remote from the slide valve. The adjustment member includes a plurality of parallel, inclined slots respectively having fixed support rods extending therethrough. When the adjustment member is moved in the direction of its elongation by manipulation of an actuator from the exterior of the housing, the rods and inclined slots also cause the adjustment member to move in a transverse direction toward and away from the packing.

10 Claims, 6 Drawing Figures

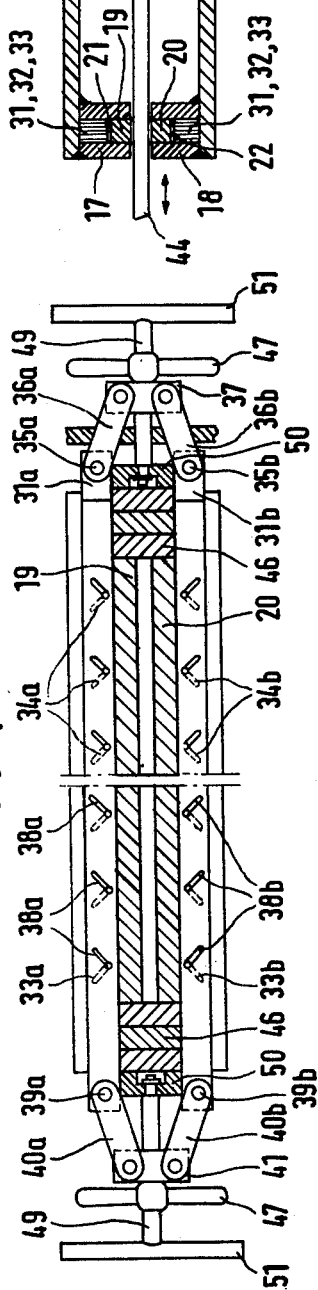
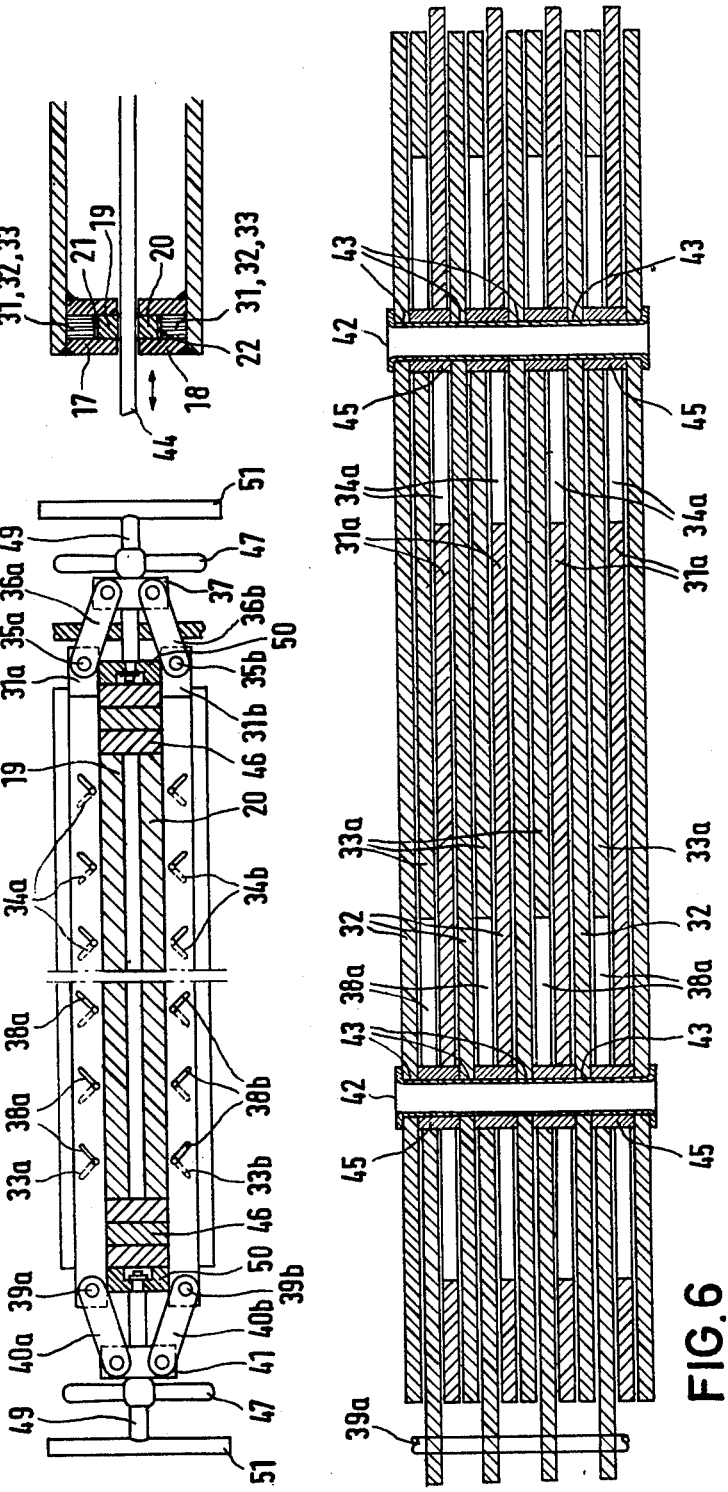
FIG. 5
FIG. 4
FIG. 6

ADJUSTING DEVICE FOR THE GLAND PACKING OF A FLAT SLIDE-VALVE

The present invention relates to an adjusting device for the gland packing of a flat slide-valve which is so arranged that the gland packing, located within a valve housing and having a substantially rectangular profile, is forced in a direction toward the flat side of the slide-valve by adjusting means that can be actuated from the outside of the valve housing.

Adjusting devices, of the type employing a strip-like member which is pressed against the rear side of the packing in a slide-valve, are already known. In general, the pushing motion of the strip member is effected by a wedge element which presses against the ends of said strip member which are, in turn, beveled at their rear sides. These known adjusting devices have the disadvantages that, in the case of long gland packings, the bearing pressure exhibited by the packing tends to be relatively slight adjacent the central portion of the slide-valve due to deformation of the strip member causing gap formations at said central portion, while, at the same time, high bearing pressures are produced adjacent the outer zones of the packing which high bearing pressures may impair and even prevent movement of the slide-valve. In view of these disadvantages, such adjusting devices have not been satisfactory for use in flat slide-valve where a pressure difference will exist between the zone of the aperture that is to be controlled by the slide-valve and the region of the slide-valve housing and/or where pulverized media are passing through said controlled aperture.

The present invention solves this problem through the provision of an adjusting device which is simple and economical in design, and which operates to generate a uniform bearing pressure throughout the entire length of the gland packing in a flat slide-valve. Practical examples of the invention are illustrated in the drawings, wherein:

FIG. 1 is a diagrammatic illustration of a first species of the invention to explain the operation of the mechanism;

FIG. 2 diagrammatically illustrates a second species of the invention, again to explain the operation of the mechanism;

FIG. 4 is a longitudinal section through the gland packing region of a flat slide-valve employing the adjusting device of the present inveniton;

FIG. 5 is a cross section of the aperture which is to be controlled by the flat slide-valve of FIG. 4; and FIG. 6 is a longitudinal section of the upper lamination sets comprising a portion of the structure shown in FIG. 4.

Figure 1:
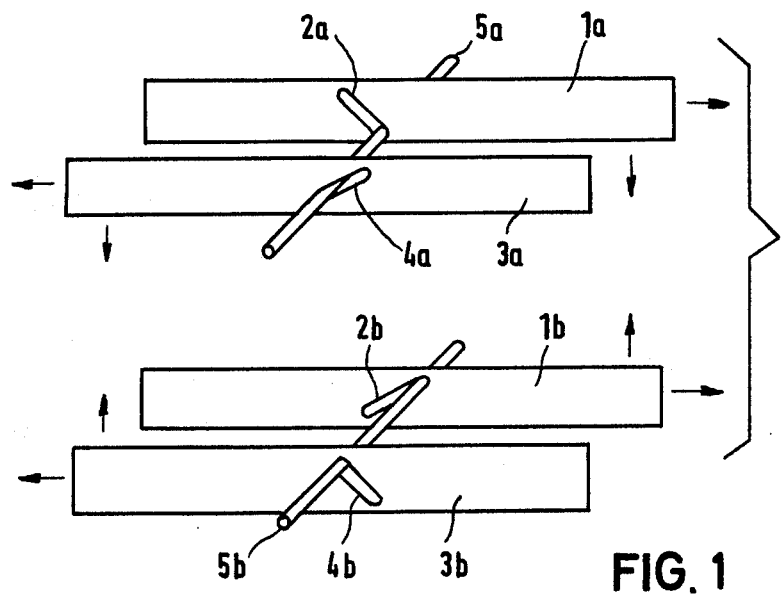
FIGS. 1 and 2 depict, diagrammatically, adjusting devices which, in each case, are adapted to control the pressure between a pair of gland packings which are disposed adjacent the opposite sides of a flat slide-valve. For purposes of simplicity, the gland packings and their associated slide valve have not been shown in either FIG. 1 or FIG. 2, but will be discussed later in reference to FIGS. 4–6.

FIG. 1 depicts one upper first lamination 1a and one upper second lamination 3a which are used for the adjustment of the unillustrated upper gland packing at one side of the slide valve, as well as one lower first lamination 1b and one lower second lamination 3b which are used for the adjustment of the unillustrated gland packing at the other side of said slide valve. The upper first lamination 1a is provided with an inclined slot 2a. The upper second lamination 3a is similarly provided with an inclined slot 4a, which is oriented in a direction opposite to the inclination of the slot 2a. A fixed rod or axle 5a passes through the slots 2a and 4a.

At the initial stage of operation shown in FIG. 1, the two slots 2a and 4a form a "V", with the axle 5a being disposed adjacent the lower extremity of each slot. If, however, the lamination 1a should be pulled in the direction of its elongation to the right, and the lamination 3a is pulled to the left, these two laminations will, due to the coaction of the inclined slots 2a, 4a and fixed rod 5a, simultaneously exhibit a downward motion, as well, i.e., the laminations will move, in a direction transverse to their directions of elongation, toward the gland packing and thus in direction toward the upper flat side of the slide-valve.

The adjusting device shown in FIG. 1 for the lower gland packing is a mirror-image of the above-described upper adjusting device, and the corresponding elements therein are denoted by the letter "b". The inclination of the slot 2b in lamination 1b runs opposite to the inclination of slot 2a, and this also holds true for the slots 4a and 4b. When the lamination 1b is pulled to the right relative to axle 5b, and the lamination 3b is pulled to the left, these two laminations will simultaneously exhibit an upward motion in a direction toward the lower gland packing.

The diagrammatic example of FIG. 1 has, for purposes of simplicity, illustrated in each case only one slot and one axle. In practice, however, a large number of slots and axles are actually provided, as illustrated in FIGS. 4 and 6. Moreover, the axles 5a and 5b have been shown in FIG. 1 in static form, but these axles 5a and 5b are actually connected with another lamination set as will be explained subsequently by reference to FIGS. 4 to 6. The V-shaped arrangement of the slots 2 and 4 thus results in an automatic centering of the axles 5, and these axles can therefore be considered to be quasi-static.

Figure 2:
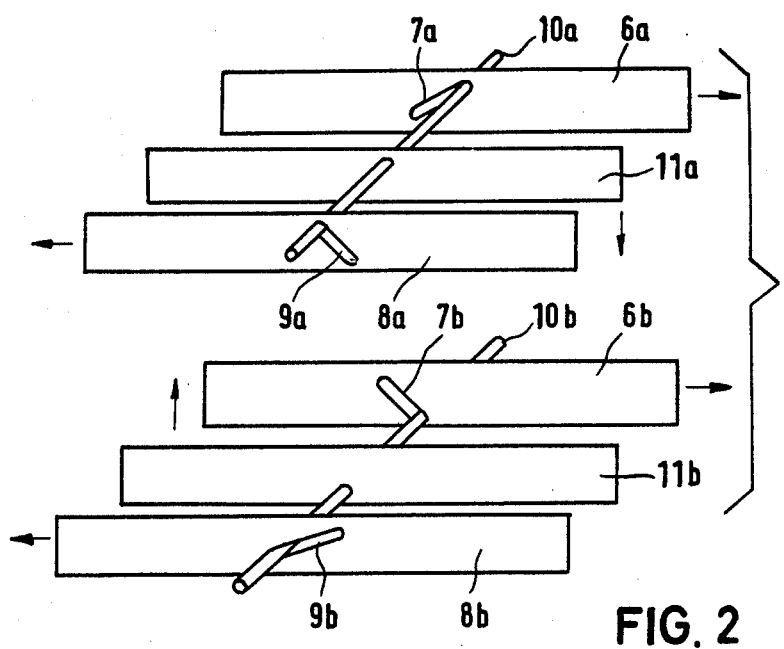

The species of the invention shown in FIG. 2 employs, for purposes of adjusting the upper gland packing of the slide-valve, a first lamination 6a having a slot 7a and a second lamination 8a having a slanted slot 9a whose slant is opposed to to the slant of the slot 7a. An axle 10a, which is fastened to another lamination 11a disposed between laminations 6a and 9a, passes through said two slots 7a, 9a. The two slots 7a and 9a together form an inverted V, with the axle 10a being initially located at the upper extremity of each slot. When the lamination 6a is pulled to the right and the lamination 8a to the left, the axle 10a, and thus the lamination 11a, will exhibit a downward motion in a direction toward the upper gland packing.

The adjusting device for the lower gland packing shown diagrammatically in FIG. 2 is designed in mirror-like fashion to the upper gland packing adjustment device, i.e., the slant of the slot 7b is oriented opposite to the slant of the slot 7a, while the slot 9b has a slant that is opposite to the slant of slot 9a. When the lamination 6b is pulled to the right, and the lamination 8b to the left, the axle 10b and its attached lamination 11b will move upwardly in direction toward the rear side of the lower gland packing.

Figure 3:
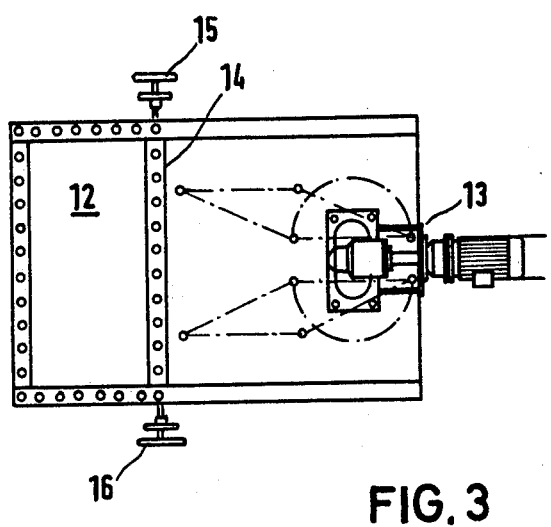
FIG. 3 is a plan view of a flat slide-valve employing an adjusting device of the type contemplated by the present invention.

FIG. 3 is a plan view of a flat slide-valve arrangement employing the adjusting mechanism of the present invention. The valve includes a rectangular flat slide-valve adapted to selectively control the opening and closing of an aperture 12. The flat slide-valve is moved across, as well as away from, the aperture 12 by means of a geared motor 13. Within the area 14 there are provided one upper and one lower gland packing, pressing against the two flat sides of the flat slide-valve. Adjusting devices operating in accordance with the principles already described are located in back of the gland packings, and these adjusting devices are adapted to be operated from the exterior of the valve housing by the adjusting elements 15, 16.

A preferred species, of the valve arrangement generally shown in FIG. 3, is illustrated in detail in FIGS. 4 to 6; and its operation corresponds to that explained above in reference to FIG. 1. Within an upper and a lower gland packing housing, 17 and 18 respectively, there are placed packings 19 and 20 respectively. Pressure plates 21 or 22 fit snugly onto the rear sides of packings 19 and 20 respectively. Behind the plates 21, 22 are located three lamination sets 31, 32, 33 which extend along the entire lengths of packings 19 and 20 in generally parallel relation to said packings.

The upper first lamination set 31a is provided with a plurality of inclined, parallel slots 34a which run from the lower right to the upper left. The laminations 31a are connected at the right end of the mechanism to a draw-arm 36a by means of a pin 35a. Draw-arm 36a is fastened to a coupling 37. To this coupling 37 there is also hinged a lower draw-arm 36b which is connected to a lower first lamination set 31b by means of a pin 35b. This lower first lamination set 31b is provided with a plurality of inclined parallel slots 34b which run from the lower left to the upper right.

At the top of the mechanism is arranged an upper second lamination set 33a which is equipped with a further plurality of inclined parallel slots 38a. These slots 38a are oriented in a direction opposite to the slant direction of slots 34a in the first lamination set 31a. For the lower packing 20 there is provided a lower second lamination set 33b having slanted slots 38b which run from the upper left to the lower right. These two second lamination sets 33a and 33b are connected to an adjustment coupling member 41 by means of pins 39a and 39b and pull-levers 40a and 40b. Axles 42 (see FIG. 6) pass through the slots 34a and 38a, and 34b and 38b respectively. These axles 42 are secured in the bores 43 of an additional lamination set 32. Rotatable sleeve 45 are disposed around the axles 45 within the region of slots 34 and 38 to facilitate the relative motion between the axles 42 and the lamination sets 31 and 33.

When the lamination set 31 is pulled to the right and the lamination set 33 is pulled to the left, these lamination sets will, as described previously, move in directions toward their associated packings 19 and 20 respectively, thereby insuring that a uniform pressure will be exerted onto the respective packing throughout the entire length of the packings 19, 20. The specific arrangement of the axles 42 at the laminations 32 results in an auto-centering. In this manner the two flat sides of the slide-valve 44 are sealed uniformly.

The slide-valve 44 is sealed laterally by further packings 46. The coupling 37 can be moved axially along a screw spindle 49 by means of a handwheel 47. Spindle 49 is mounted within the slide-valve housing and is provided at its front with a contact piece 50 which applies a suitable bearing pressure to the packing 46 when the spindle 49 is screwed-in by means of a handwheel 51. Handwheels 47 and 51 are both located outside of the valve housing as shown in FIG. 3. When the coupling 37 is pulled axially outward by turning of the handwheel 47, an adjustment of the packings 19, 20 is accomplished thereby. Obviously, this applies also to the left side of the mechanism relative to the coupling 41.

Having thus described my invention, I claim:

1. In a valve of the type comprising a valve housing having means defining an aperture to be controlled, a flat slide valve within said housing mounted for movement toward and away from said aperture to selectively open and close said aperture, a gland packing within said housing, said packing being of elongated flat-surfaced substantially rectangular configuration and having one of its elongated flat surfaces in engagement with one side of said flat slide valve, and adjustment means for controlling the engagement pressure between said packing and said slide valve, the improvement wherein said adjustment means comprises at least one elongated flat-sided lamination mounted with a flat side thereof disposed adjacent and substantially parallel to a second flat surface of said packing opposite to said one flat surface and remote from said slide valve, said elongated lamination including a plurality of slots therein extending parallel to one another and at an inclination to the direction of elongation of said lamination, a plurality of fixed axles extending through said plurality of slots respectively in direction transverse to the direction of elongation of said lamination, and control means operable from the exterior of said valve housing for moving said elongated lamination in the direction of its elongation whereby the coaction between said slots and said axles simultaneously causes said elongated lamination to move within said housing in a direction transverse to its direction of elongation toward said gland packing.

2. The structure of claim 1 wherein each of said axles supports a rotary sleeve within each of said slots to facilitate movement of said axles and slots relative to one another.

3. The structure of claim 1 wherein said adjustment means comprises two elongated flat-sided laminations disposed in generally parallel relation to one another, each of said laminations having a plurality of parallel slots therein disposed at an inclination to the direction of elongation of their associated lamination, the inclinations of the plurality of slots in one of said laminations being oriented in directions opposite to the inclinations of the plurality of slots in the other of said laminations, each of said axles passing through an inclined slot in each of said two pluralities of slots, said control means being operable to move both of said elongated laminations in their respective directions of elongation but in opposite directions to one another thereby to cause both of said laminations to move within said housing in directions transverse to their respective directions of elongation toward said gland packing.

4. The structure of claim 3 wherein said adjustment means includes a third elongated lamination adjacent to said two laminations, said axles all extending in directions transverse to the directions of elongation of all three laminations and passing through circular bores provided in said third lamination.

5. The structure of claim 3 including an elongated pressure plate disposed between said laminations and said packing.

6. The structure of claim 1 wherein said valve includes a further gland packing within said housing in engagement with the other side of said flat slide valve, said adjustment means including a further lamination disposed adjacent to the surface of said further gland packing remote from said slide valve, said further lamination including a plurality of inclined slots having a plurality of further axles extending therethrough in a configuration corresponding to that of said first-mentioned lamination, and said control means including means operable to move both of said laminations in their respective directions of elongation thereby to move said laminations in directions transverse to their directions of elongation toward one another and toward both of said gland packings on opposite sides of said slide valve.

7. The structure of claim 6 wherein said control means includes a pull mechanism supported within said housing and hingedly connected to one end of each of said laminations.

8. The structure of claim 6 wherein said adjustment means includes a first pair of laminations disposed adjacent one of said gland packings and a second pair of laminations disposed adjacent the other of said gland packings, each of the laminations in each pair including a plurality of said inclined slots, the inclinations of the slots in the laminations of each pair being oriented opposite to one another, corresponding oppositely inclined slots in each of said pairs of laminations having one of said axles extending therethrough, said control means including a first pull mechanism supported within said housing and hingedly connected to a first end of one lamination in each of said pairs of laminations, said control means including a second pull mechanism supported within said housing and hingedly connected to the second end, opposite to said first ends, of the other laminations in each of said pairs of laminations, and means for operating both of said pull mechanisms from the exterior of said housing.

9. The structure of claim 8 wherein each of said pull mechanisms includes a threaded spindle, a coupling member in thread engagement with said spindle, and a pair of pull arms pivotally connected to and extending from said coupling member to the two laminations associated with said pull mechanism.

10. The structure of claim 9 wherein said valve includes lateral packings adjacent opposing edges of said slide valve, contact pieces carried by said threaded spindles respectively adjacent said lateral packings, and means for axially adjusting said threaded spindles to move said contact pieces toward said lateral packings to adjust the pressure exerted by said contact pieces on said lateral packings.

* * * * *